United States Patent
Kori et al.

(10) Patent No.: US 8,475,556 B2
(45) Date of Patent: Jul. 2, 2013

(54) FILTER CARTRIDGE SYSTEM

(75) Inventors: Anil Kori, Satara (IN); Mario Rieger, Freiberg (DE); Werner Blossey, Benningen (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/253,307

(22) Filed: Oct. 5, 2011

(65) Prior Publication Data

US 2013/0086877 A1   Apr. 11, 2013

(51) Int. Cl.
*B01D 46/00*   (2006.01)

(52) U.S. Cl.
USPC .................................. 55/482; 55/498; 55/502

(58) Field of Classification Search
USPC ............... 55/498, 582, 502–504, 521; 95/273
See application file for complete search history.

(56) References Cited

U.S. PATENT DOCUMENTS

| | | | |
|---|---|---|---|
| D416,308 S * | 11/1999 | Ward et al. ................... | D23/209 |
| 6,599,342 B2 | 7/2003 | Andress et al. | |
| 6,986,805 B2 * | 1/2006 | Gieseke et al. ................. | 95/273 |
| 7,828,870 B1 * | 11/2010 | Rech et al. ...................... | 55/498 |
| 8,066,791 B2 * | 11/2011 | Baseotto et al. ................ | 55/503 |
| 8,163,056 B2 * | 4/2012 | Coulonvaux et al. ........... | 55/498 |
| 8,292,984 B2 * | 10/2012 | Baseotto et al. ................ | 55/498 |
| 2004/0134171 A1 * | 7/2004 | Scott et al. ...................... | 55/482 |
| 2005/0028500 A1 | 2/2005 | Gieseke et al. | |
| 2009/0049814 A1 * | 2/2009 | Baseotto et al. ................ | 55/482 |
| 2009/0249756 A1 * | 10/2009 | Schrage et al. ................. | 55/498 |
| 2009/0272085 A1 * | 11/2009 | Gieseke et al. ................. | 55/502 |
| 2010/0146920 A1 * | 6/2010 | Iddings et al. .................. | 55/502 |
| 2011/0000174 A1 | 1/2011 | Kapelarie et al. | |
| 2011/0258975 A1 * | 10/2011 | Lundgren et al. ............... | 55/357 |

FOREIGN PATENT DOCUMENTS

| WO | 0245819 A2 | 6/2002 |
|---|---|---|
| WO | 02078816 A1 | 10/2002 |
| WO | 2007009040 A1 | 1/2007 |
| WO | 2012116314 A1 | 1/2009 |
| WO | WO2010057843 A1 | 5/2010 |
| WO | WO2010057845 A1 | 5/2010 |

OTHER PUBLICATIONS

Search Report of the WIPO for PCT/EP2012/068841, dated as completed Apr. 22, 2013, with the written opinion.

\* cited by examiner

*Primary Examiner* — Duane Smith
*Assistant Examiner* — Amber Orlando
(74) *Attorney, Agent, or Firm* — James Hasselbeck

(57) ABSTRACT

A secondary filter cartridge radially nested within and radially supported by a main filter cartridge. The secondary cartridge has a flexible multi-leg crown "with slits" which engage a receptacle of the main filter element for radial support and a central pin projection interior to the crown extending outwards to protect the crown from impact damage. The main filter cartridge bottom end disk has axially extending, spaced apart projections engaged into matching pockets or gaps provided between engaging inward projections on an interior end face of the filter housing, rotationally fixing or locking the filter housing and the main filter cartridge. The main filter cartridge includes an anti-rotation housing engagement member extending through a filter housing wall to the exterior indicating presence of a properly installed filter cartridge and rotatably locking position of the housing and main filter cartridge.

17 Claims, 10 Drawing Sheets

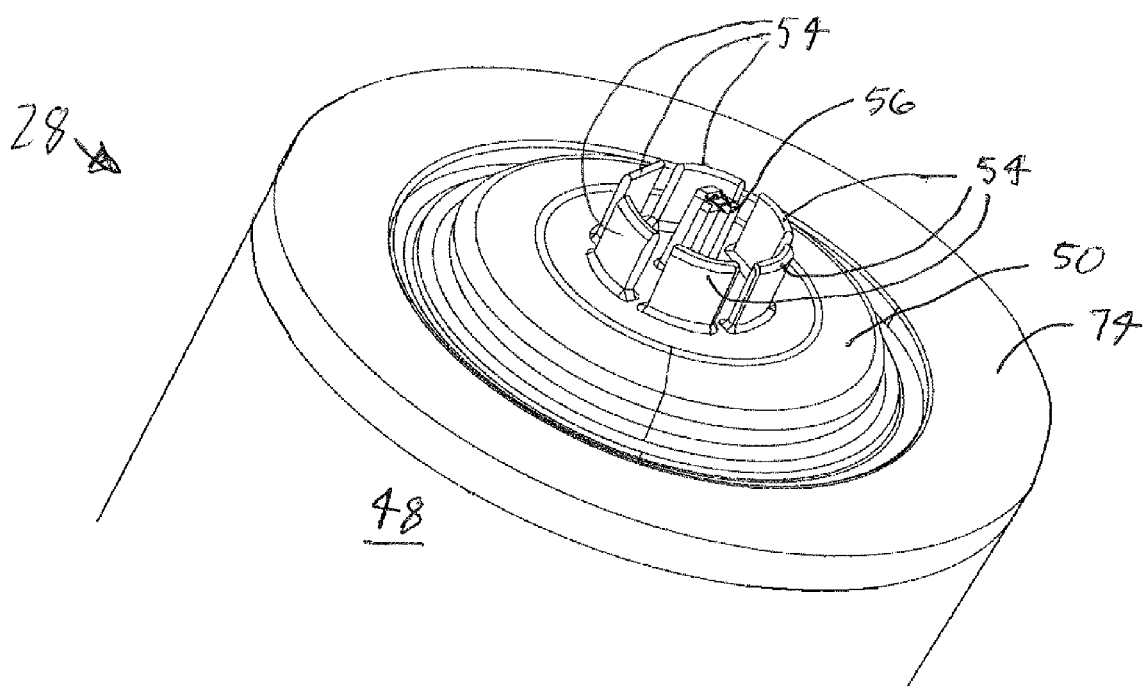

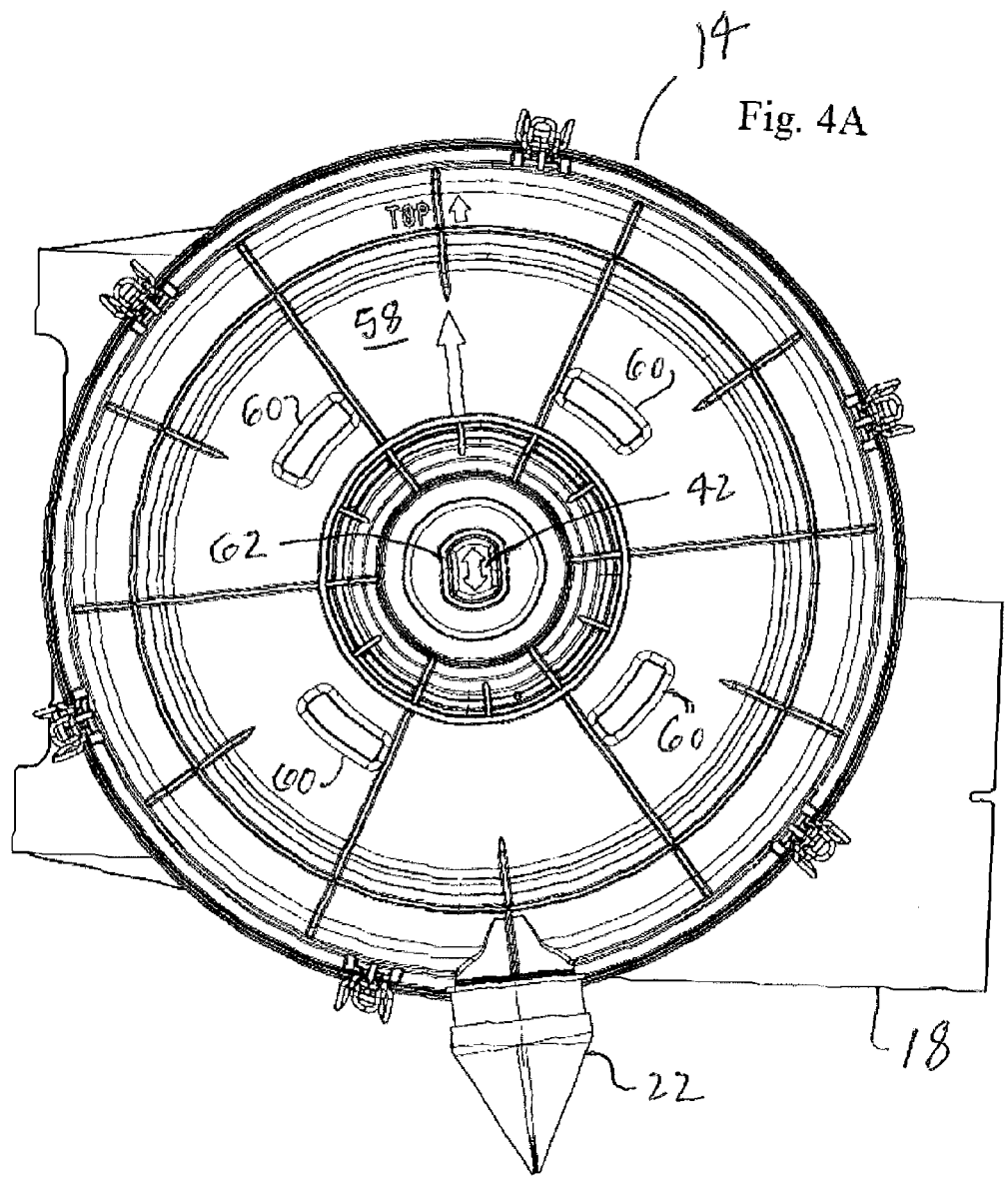

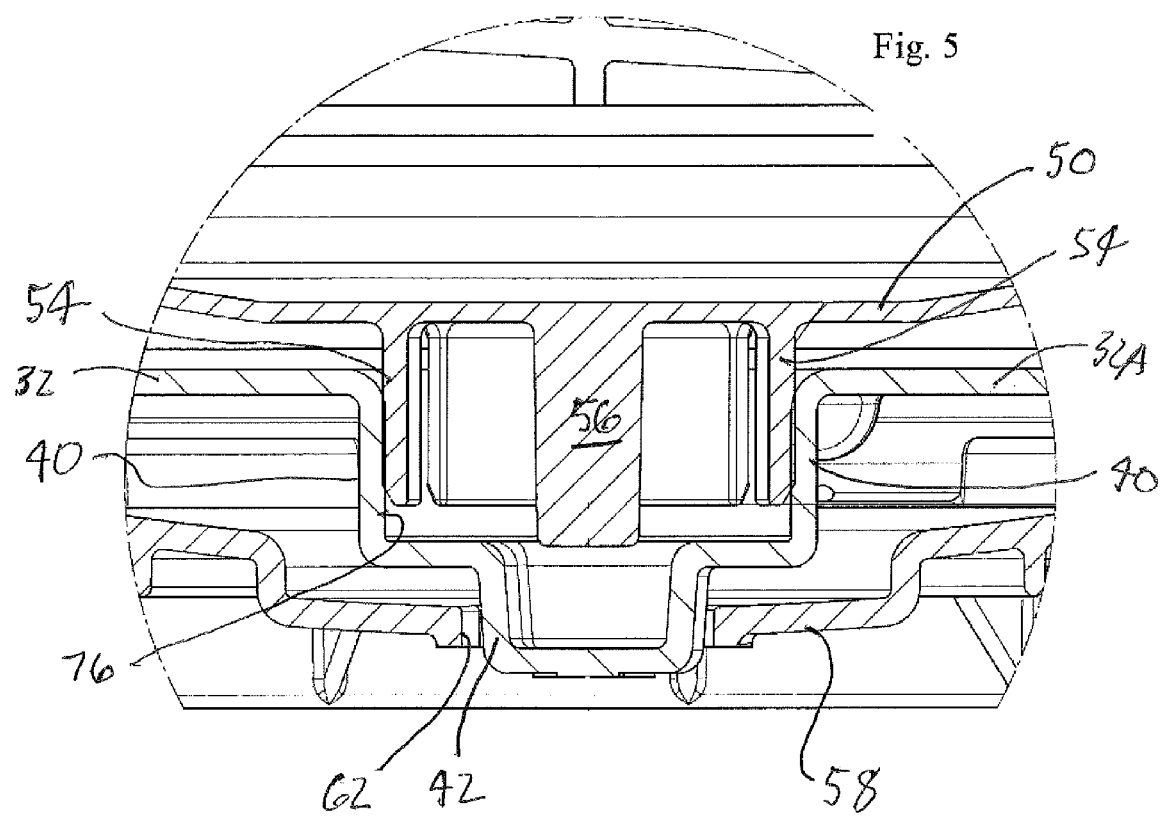

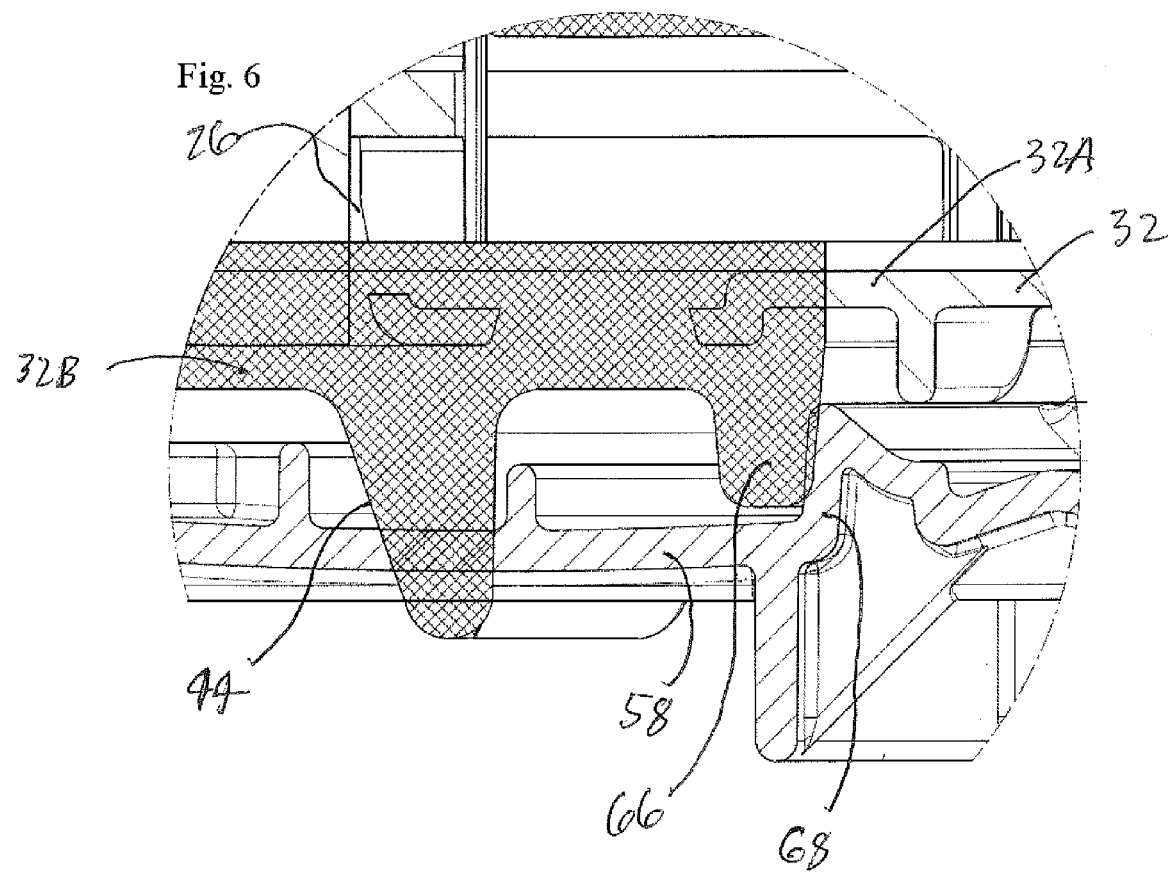

FILTER CARTRIDGE SYSTEM

TECHNICAL FIELD

The present invention is related to air filter cartridges and an air filter system for filtering air delivered to internal combustion engines, compressors or other apparatus requiring filtered air. The system includes a main filter cartridge and optionally a secondary filter cartridge radially nested within the main filter cartridge, the main and secondary cartridges cooperatively engaging with each other and with interior features of the filter housing.

BACKGROUND OF THE INVENTION

Various types of air filter cartridges and air filter systems for filtering particulates and contaminants from air for internal combustion engines and compressors are known in the art.

Known are varieties of elongated cylindrical cartridge filter elements having an open central interior and are configured to filter a radially directed airflow. Such filter elements are typically removeably installed into complimentary configured filter housings.

Varieties of filter housings having removable covers or detachable housing portions and configured to receive such filter elements are also known in the art. Such devices find application in filtering various liquid and gaseous fluid media.

As is generally known in the art, internal combustion engines such as stationary engines, motor vehicles and off road equipment require the air filtration systems to remove particulate and possibly chemical contaminations from the intake air. The air filter system typically includes an openable/serviceable filter housing having air intake and outlet ports as well as a filter element or filter cartridge removeably and replaceably installed with the filter housing.

SUMMARY OF THE INVENTION

In various aspects of the invention a filter cartridge assembly and system includes a secondary filter cartridge radially nested within and radially supported by a main filter cartridge. The secondary cartridge has a flexible multi-leg crown "with slits" which engages into a receptacle in an outwardly extending dome in the bottom end disk of the main filter element for radial support and includes a central pin projection interior to the crown with a long outwardly extending length than the crown and is structurally more robust than the crown, extending beyond the crown to protect the crown from impact damage (for example if the crown filter cartridge is dropped or mishandled). The main filter cartridge bottom end disk also has a plurality of axially extending, spaced apart elastomeric projections configured to engaged into complimentary configured pockets or gaps provided between other inward projections provided on an interior end face of the filter housing, thereby rotationally fixing or locking the filter housing and the main filter cartridge. The main filter cartridge includes an anti-rotation housing engagement member or pin which extends through an end wall of the filter housing to the exterior of the housing indicating presence of a properly installed filter cartridge.

In one aspect of the invention, the filter cartridge assembly includes a substantially rigid support tube having airflow apertures therethrough. A filter media is arranged on, surrounding and secured onto the outside surface of the support tube. An annular end cap is secured to a first axial end of the support tube and/or to the filter media. The support tube includes an axially outwardly projecting elastomeric annular sealing collar surrounding the open aperture in the end cap. A closed end cap is secured to an opposing second axial end of the support tube. The closed end cap includes a substantially rigid first end cap layer unitary with the support tube sidewall. An axially outwardly extending dome member is centrally arranged on the closed end cap. An anti-rotation engagement housing member is arranged on an outward facing surface of the dome member. The anti-rotation engagement member has a radially elongated or polygonal radial cross section configured to be received into and rotationally lock to the complimentary anti-rotation opening provided in and extending through an end face of the filter housing to lock locking rotational alignment of the first filter cartridge to the filter housing. A plurality of axially extending elastomeric projections is provided on an outward facing surface of the closed end cap encircling the dome member with circumferential gaps between the elastomeric projections. The elastomeric projections each have pre-defined keying characteristics including: A pre-defined arc length, wherein different ones of the axially extending elastomeric projections can have different lengths. A pre-defined projection length measured axially relative to the outward facing surface, wherein different ones of the axially extending elastomeric projections can have different projection lengths. A pre-defined axially extending elastomeric projection width, wherein different ones of the axially extending elastomeric projections can have different projection widths. A pre-defined gap spacing between adjacent elastomeric projections, wherein different pairs of the projections can have different gap spacings. A pre-defined number of the axially extending elastomeric projections. The pre-defined characteristics of the elastomeric projections and complimentary inward projections on the filter housing end face key a particular intended type of the filter cartridge for use in filter housing while excluding unsuitable or off specification filter cartridges. A continuous annular seal is arranged radially between the plurality of axially extending elastomeric projections and the dome member and projected axially outwardly from the outward facing surface of the second end cap layer, the annular seal configured to radially seal against the outward facing surface of an annular sealing projection provided on an interior of an adjacent housing end face.

In another aspect of the invention the filter cartridge assembly includes a secondary filter cartridge axially aligned with and radially nested within the open interior of the main filter cartridge. The second filter cartridge includes a substantially rigid support tube, an end cap extending over a first axial end of the support tube and formed as a unitary one piece component together with the support tube. An axially outwardly extending, substantially rigid and at least partially radially compressible crown is formed in one piece with or permanently secured to an axially outwardly facing surface of the secondary element end cap, The crown includes an axially aligned outwardly extending central projecting pin and a plurality of axially outwardly extending legs arranged radially encircling the projecting pin, the legs forming a tubular extension with axial slits separating the legs. The central projecting pin extends outwardly beyond the plurality of axially extending legs and is operable to absorb impact and protect the crown legs from impact damage.

In another aspect of the invention, the filter media of the secondary filter cartridge is a non-woven filter media including nylon, polyester, glass or polypropylene fibers.

In another aspect of the invention an elastomeric fixation ring is secured to an axially outwardly facing surface of the secondary element end cap. The elastomeric support ring has an open interior through which the crown axially projects.

The elastomeric support ring is bonded to an edge portion of the secondary element filter media securing the secondary element filter media to the secondary element support tube.

In another aspect of the invention the secondary element filter media is secured to the secondary element support tube by welding.

In another aspect of the invention the secondary element filter media is secured to the secondary element support tube by metal or plastic clamp rings compressably mounting the secondary element filter media onto the secondary element support tube.

In another aspect of the invention the filter cartridge assembly includes a filter housing having an inlet connection for receiving unfiltered air. An outlet connection for filter air is arranged in a first end wall of the filter housing. A second opposing end wall of the filter housing includes an anti-rotation opening provided in a central portion of the end wall and extending from an interior of the filter housing to an exterior of the filter housing. A plurality of inwardly extending end wall projections are arranged on an inner surface of the end wall encircling the anti-rotation opening.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIGS. 3A and 3B depict perspective views of an exemplary secondary filter cartridge configured to radially nest within and supportively engage with a main filter cartridge, such as the main filter cartridge of FIGS. 2A-2C, consistent with the present invention;

FIG. 4A depicts an exterior end wall view of a second housing part or housing cap illustrating features of the present inventive disclosure, consistent with the present invention;

FIG. 5 depicts an enlarged view of the region identified as "5" in FIG. 1; and FIG. 6 depicts an enlarged view of the region identified as "6" in FIG. 1.

Figure 1:
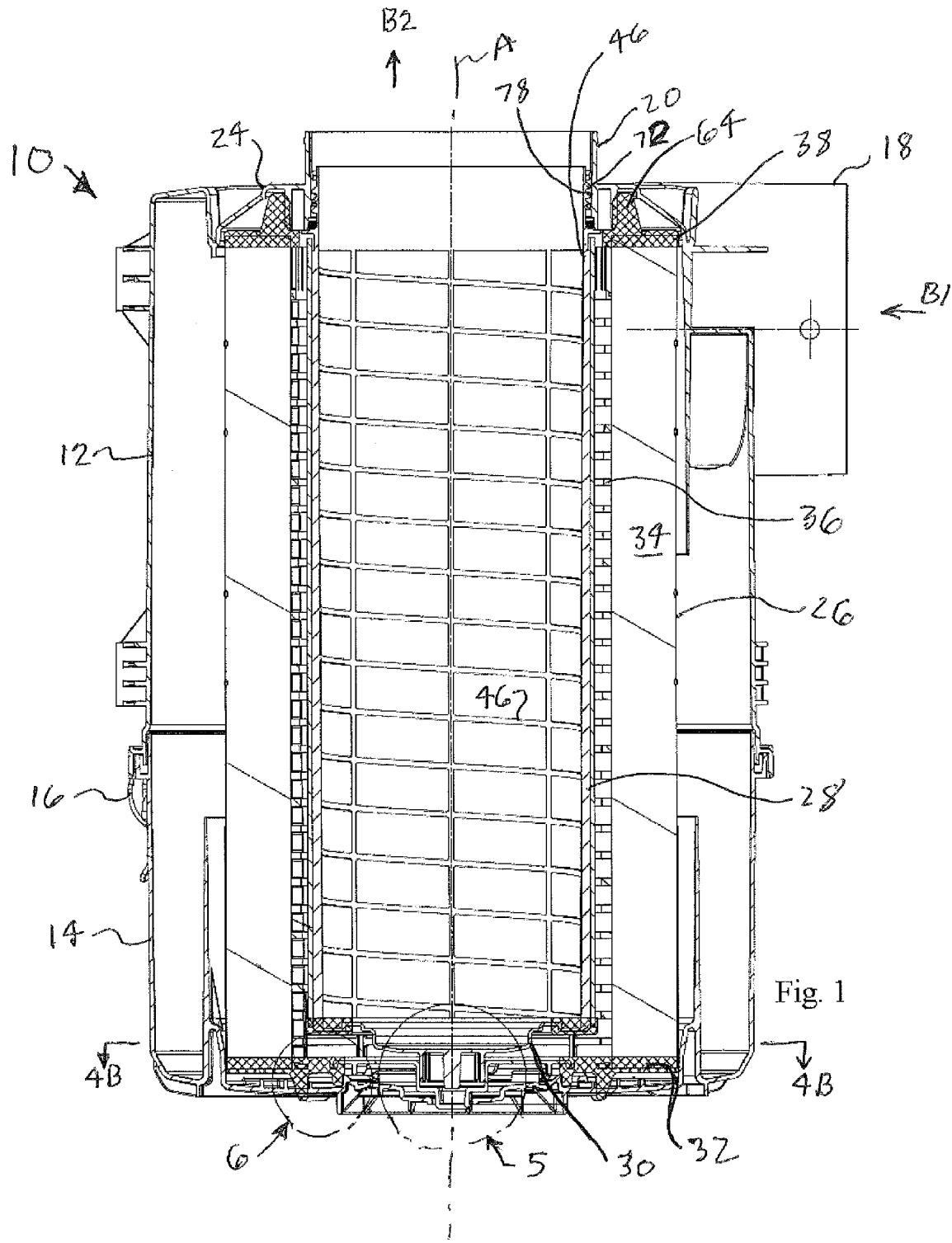
FIG. 1 depicts a sectional side view of an exemplary air filter system including an axially openable/serviceable filter housing and filter cartridge(s) removeably installed within the filter housing, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to cartridge filters and the filter housing designed to receive such cartridge filters. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 depicts a sectional side view of an exemplary air filter system 10. The filter system 10 includes a first housing part 12 and an axially and sealably mating second housing part 14. In the embodiment of FIG. 1 the housing parts 12, 14 are detachably secured together by releasable mounting means, for example spring clamps or latches 16. The second housing part 14 may be removed from the first housing part 12 in an axial direction by first releasing spring clamps 16.

As defined herein, the "axial direction" is a direction parallel to the axis "A" as shown on FIG. 1 corresponding to the central axis of the filter cartridge 26.

In the exemplary embodiment of FIG. 1 the inlet connection 18 is provided on the radially outer wall of the first housing part 12 and delivers air to be filtered (arrow "B1") tangentially into and along the inner circumference of the first housing part 12. A tangential air delivery into the filter housing 12,14 is preferred as incoming air is then circumferentially swirled within the filter housing 12,14, the filtration thereby benefiting from the inertial effects of the swirling air to separate particulates from the inlet air by centrifugal force before entering the filter cartridges. When the air inlet connection 18 is arranged tangentially as described above, it is preferred to provide a dust discharge valve 22 on the outer wall of the housing as shown later in FIGS. 4A and 4B to discharge accumulated dust from the filter housing. The illustrated dust discharge valve 22 is an elastomeric "duckbill" valve which is held closed by vacuum within the filter housing during operation and opens in response to pressure fluctuations or when the connected engine or compressor ceases operation.

An outlet connection 20 is provided on an end face 24 of the first housing part 12 (airflow according to arrow "B2"). Preferably, for efficient utilization of space within the filter housing, the outlet connection 20 is concentrically positioned relative to the circumferential outer wall of the filter housing.

Arranged and enclosed within the filter housing 12,14 is a main filter cartridge 26 and optionally a secondary filter cartridge 28. The secondary filter cartridge 28 is advantageously radially nested within the main filter cartridge and supportively engages the end cap 30 of the secondary filter cartridge 28 with the end cap 32 of the main filter cartridge, as described later.

The main filter cartridge 26 is depicted as an axially elongated cylindrical filter cartridge which includes a circumferentially closed filter media 34 circumferentially surrounding and supported against and secured to an air permeable support tube 36 (see discussion with FIG. 1 above). Preferably the filter media 34 is a pleated paper filter media with media folds having ridges and valleys extending axially (direction of axis A) between the upper end cap 38 and the lower end cap 32 of the main filter cartridge 26.

The support tube 36 preferably is made of a sufficiently rigid (stiff) plastic or metallic material such that the support tube 36 is operative to provide structural support to the filter media 34 so as to resist inwardly directed radial forces induced on the filter media 34 due to fluid flow through the filter media 34. The support tube 36 includes a grille or grate structure surrounding air permeable apertures, such as shown in FIG. 1. Support tube 36 may alternately be realized as a solid tube, such as a plastic tube, provided with a plurality of spaced holes or apertures configured to permit air flow through the circumferential wall of the support tube. In other embodiments, airflow permeable wall portions of the support tube may be realized by other means, for example as a wire mesh.

Figure 2A:
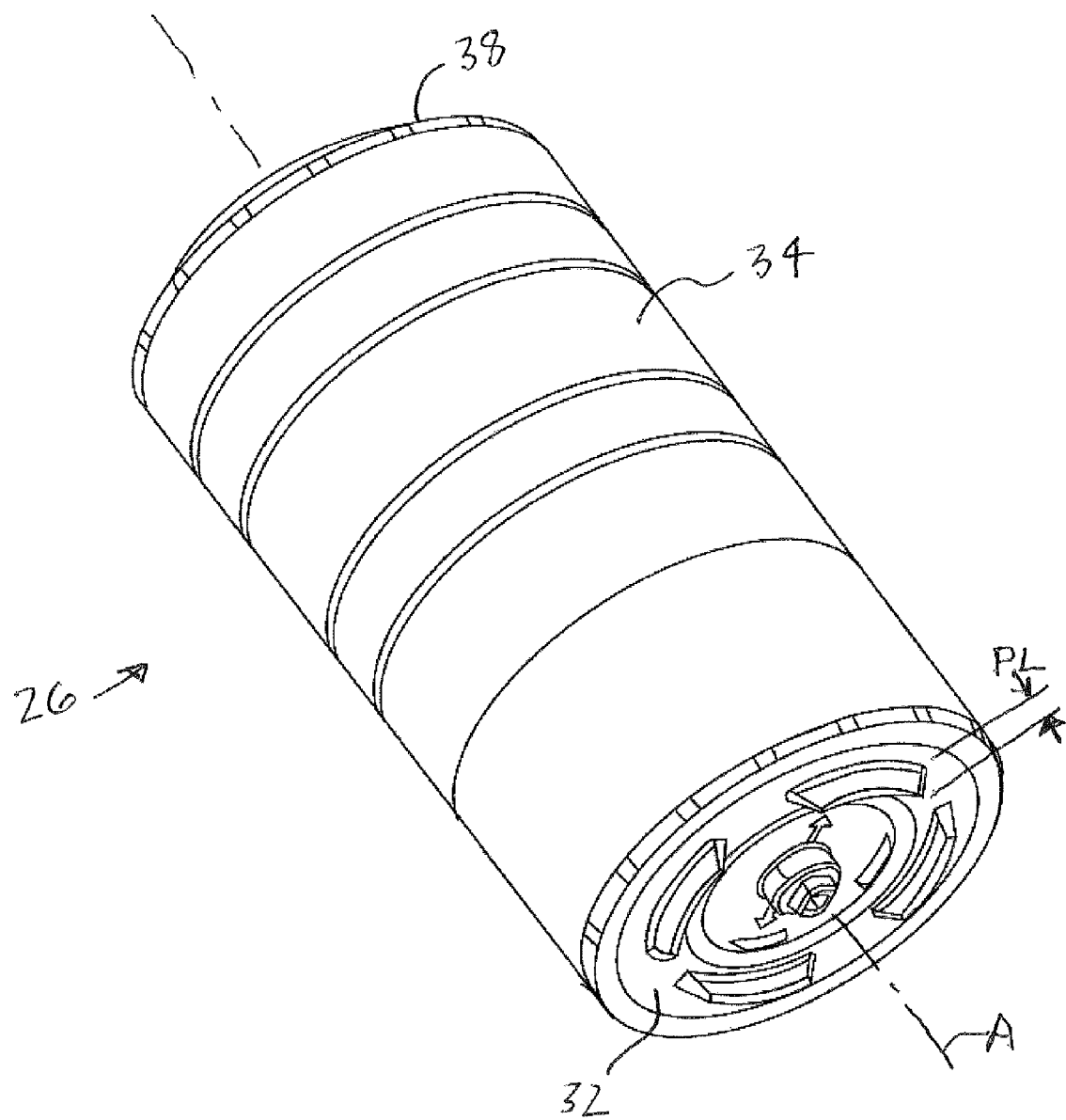
FIGS. 2A-2C depict perspective views of an exemplary main filter cartridge, consistent with the present invention.
Figure 2B:
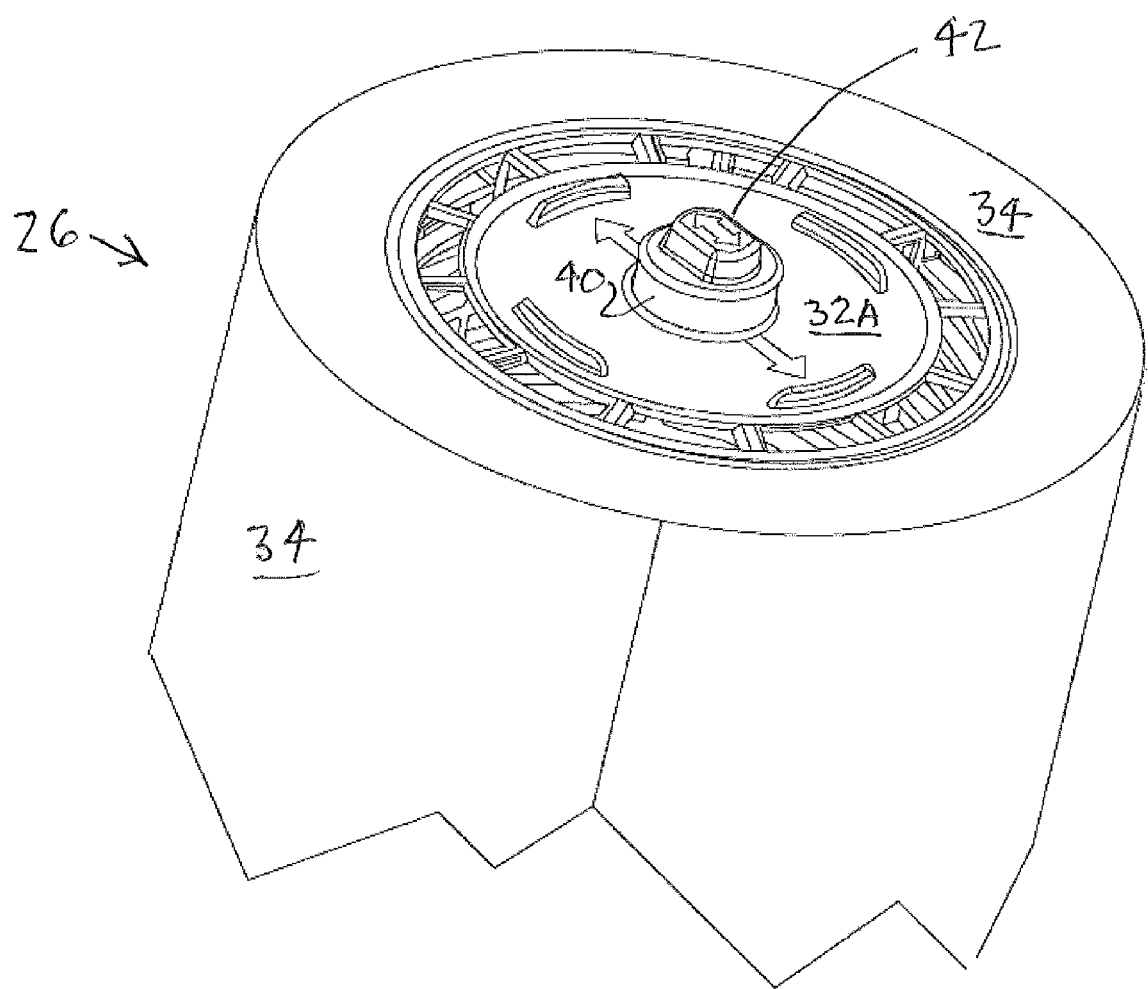
Figure 2C:
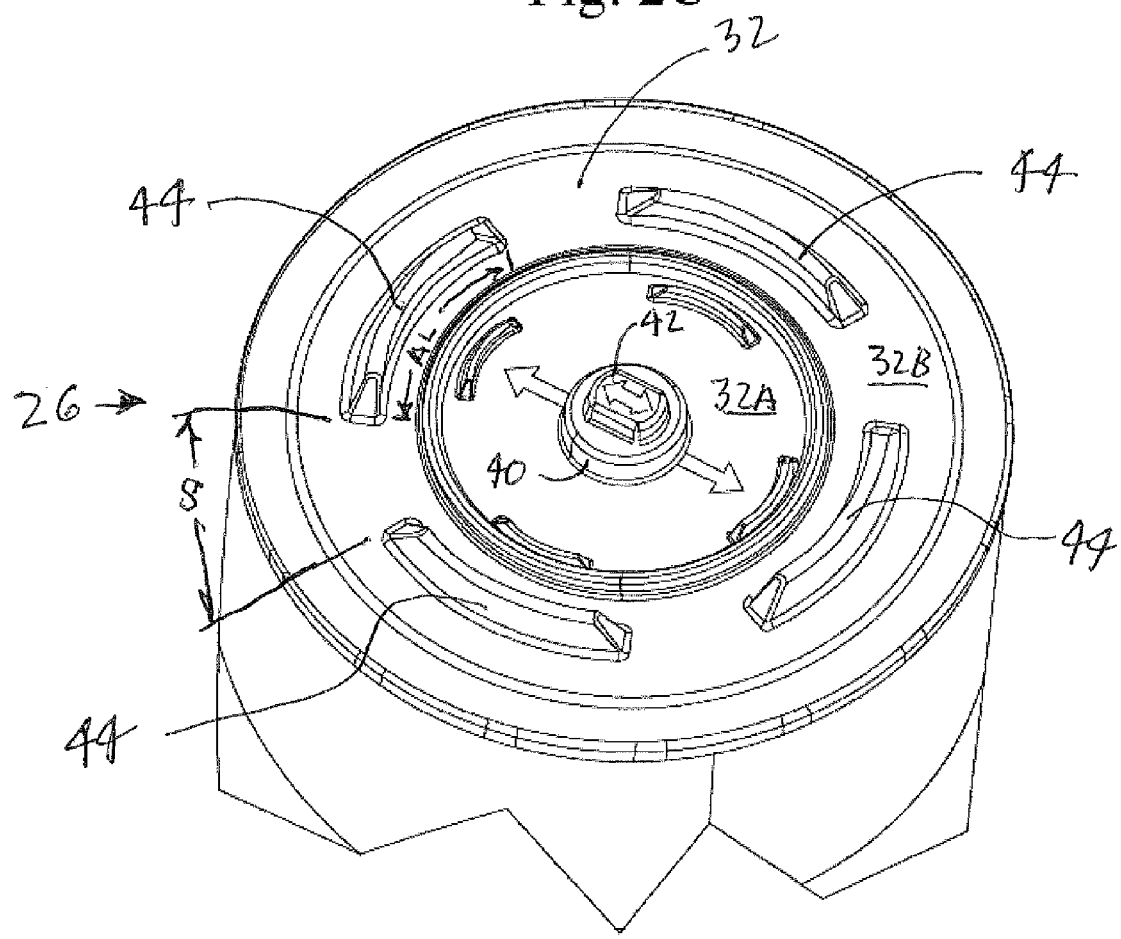

FIGS. 2A-2C depict perspective views of the exemplary main filter cartridge 26. The main filter cartridge 26 is depicted as a axially elongated cylindrical filter cartridge which includes a circumferentially closed filter media 34 circumferentially surrounding and secured to an air permeable support tube 36 (see discussion with FIG. 1 above). The main filter cartridge includes an upper end cap 38 and a lower end cap 32. The main filter cartridge, as depicted in FIG. 2A, is preferably a one-piece unit which is removeably and replaceably installed into a filter housing 12, 14 as a single monolithic replaceable or serviceable component.

The lower end cap 32 preferably is a two component end cap having a substantially rigid plastic cap layer 32A, preferably a unitary one-piece component of the support tube 36, overlaid by an elastomeric sealing material (example: polyurethane) molded onto or secured onto substantially rigid plastic cap layer 32A of the support tube 36.

The lower end cap 32 includes an axially outwardly extending dome member 40 having a receptacle 40 opening into the interior of the main filter cartridge 26, the dome member includes an anti-rotation housing engagement member 42, preferably formed unitary with the dome member.

The housing engagement member 42 may have an oval cross section, or preferably (as shown) the housing engagement member 42 is a "convex rectangular" cross section, where herein we define "convex rectangular" to be a two-dimensional shape having two parallel straight sides and closed at opposing ends by arc portions (not necessarily full semi-circles). FIGS. 2B and 2C show the housing engagement member 42 having the herein defined convex rectangular cross section.

Within the present invention the anti-rotation housing engagement member 42 may have other cross-sectional shapes, for example triangular or other polygonal shapes, oblong, ellipse, etc. Advantageously, the cross section of the anti-rotation housing engagement member 42 provides a rotationally locked engagement of the main filter cartridge 26 to the filter housing 14 end face.

As shown in FIG. 2B the substantially rigid plastic cap layer 32A preferably is provided with a plurality of radially extending ribs with open spaces therebetween. The ribs and open spaces permit the overlaid elastomeric sealing material 32B (example: polyurethane) to infiltrate into the substantially rigid plastic cap layer 32A and securely engage to the substantially rigid plastic cap layer 32A to form a monolithic or unitary lower end cap 32 which is preferably one piece with the support tube 36 and main filter cartridge 26.

Advantageously, as shown on FIGS. 2A and 2C, the lower end cap 32 of the main filter cartridge 26 includes a plurality of arcuate circular arc shaped projections 44, the projections 44 extending axially outwardly from the lower end cap 32. Preferably the projections 44 are formed into or molded onto the elastomeric sealing material 32B of the lower end cap 32. The arcuate circular arc shaped projections 44 each have predefined and possibly differing projection arc lengths AL, projection length PL and projection to projection spacing S operative to uniquely and positively "key" a particular service required type of main filter cartridge 26 with a desired/required service specification to the filter housing, 12, 14, as will be explained in further detail below.

Although the arc shaped or arcuate projections are discussed herein and curved projections are shown on the drawings, it is to be understood that wherever the term "arcuate" is used, we hereby and herein define "arcuate" projections to include projections having any radius, including an infinite radius (i.e. linear/straight line/uncurved projections).

Figure 3A:
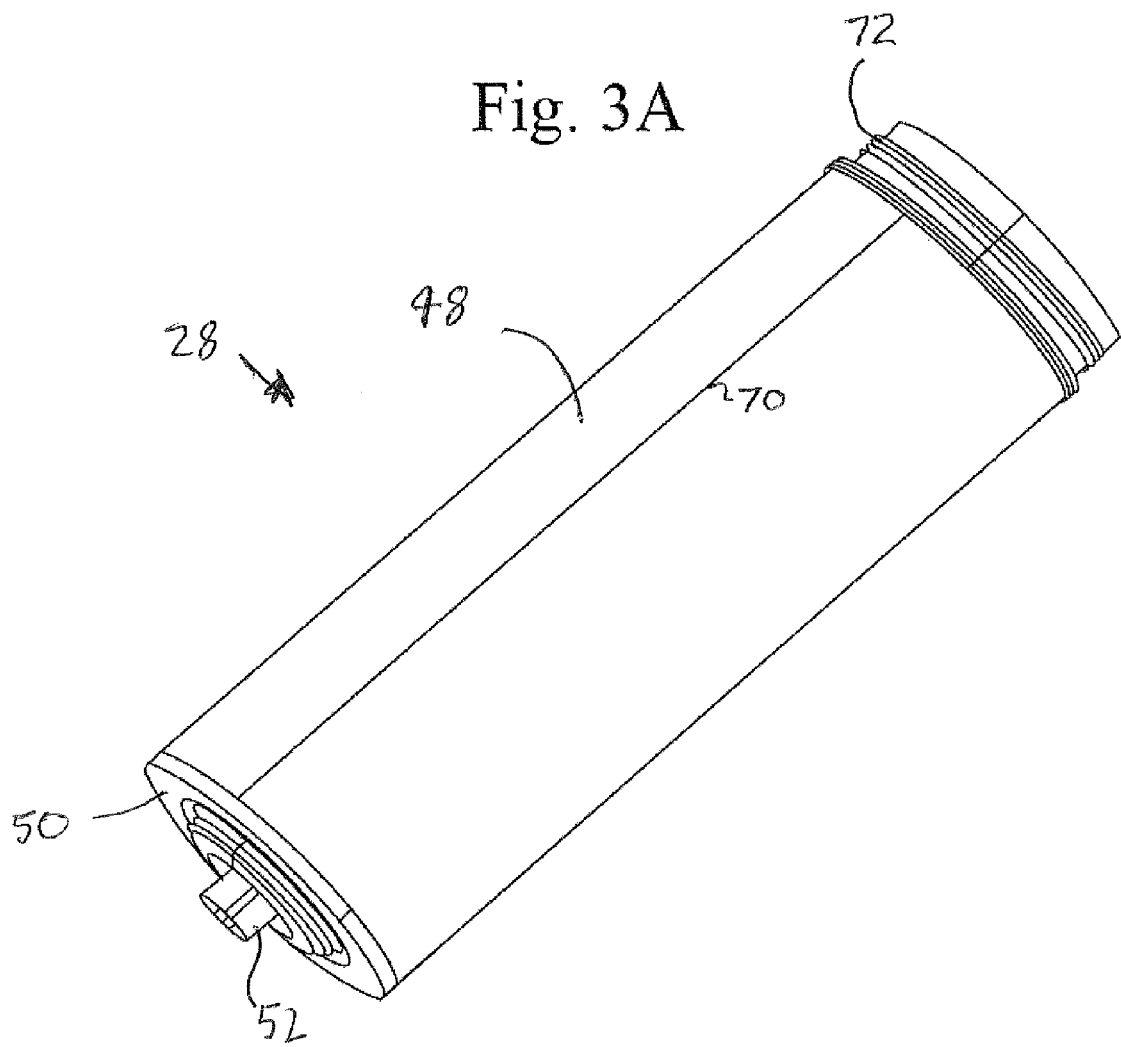

In some filter systems 10, a secondary filter cartridge 28 or fine filter cartridge is radially nested within the open interior of the main filter cartridge 26 and arranged downstream with respect to flow relative to the main filter cartridge 26. An exemplary secondary filter cartridge 28 is shown in FIGS. 3A and 3B.

The secondary filter cartridge 28 includes an elongated, preferably cylindrical airflow permeable support tube 46, preferably mountably engaging with the airflow outlet connection 20 and extending inwardly into the filter housing 12, 14 to radially nest within the interior of the main filter cartridge 26 (see FIG. 1). The elongated support tube 46 may be generally cylindrical in shape having air permeable walls formed by a network of spaced ribs having airflow apertures therebetween. The ribs may also include cross members forming a grid like structure as the walls of the elongated support tube 46. The secondary filter cartridge 28 support tube 46 includes a first axial end configured to detachably mount to the interior of the first housing part 12, preferably a threaded connection into the interior wall of the outlet connection 20 of the first housing part 12, although bayonet connections or a press-fit connection is also suitable and within the scope of the present inventive disclosure.

The support tube 46 forms a support member for the filter media 48 of the secondary filter cartridge 28. The filter media 48 is arranged circumferentially on and circumferentially about the cylindrical wall of the support tube 46. The filter media 48 is configured to close over all openings or apertures provided in the cylindrical wall of the support tube 46 (see FIG. 1) such that air flowing from within the filter housings (12, 14) is required to flow through the secondary filter cartridge 28 before it can reach the outlet connection 20 to exit the filter housing. The support tube 46 is operative to provide structural support to the secondary filter cartridge 28 filter media 48 such that the filter media 48 may resist forces acting upon the filter media 48 such as due to air flowing through the secondary filter cartridge 28.

The secondary filter cartridge 28 is positioned and arranged as an after filter or fine particle filter to the main filter cartridge 26. The secondary filter cartridge 28 also serves to protect devices downstream of the air outlet connection 20 from receiving unfiltered, dirty or particulate contaminated air even if the main filter cartridge 26 fails or is not present in the filter housing (12,14), such as can occur (for example) when the main filter cartridge 26 is removed for servicing and/or replacement.

At the end axial end opposing the axial end 72 at which the secondary filter cartridge 28 detachably mounts to the filter housing 12, 14 (preferably by thread 72), the secondary filter cartridge 28 includes an end cap 50. The filter media 48 is secured to the outer surface of the support tube 46 by polyurethane molding of the end cap 50 or alternately by welding of the filter media 48 onto the support tube 46, welding preferably by ultrasonic welding, or alternately by the use of metal or plastic clamp rings clamping circumferentially onto the other surface of the filter media 48 compressibly securing the filter media 48 to the support tube 46. The support tube 46 is preferably an injection molded plastic component of preferably PA6 GF30 or PPT20 material, although not limited to these materials. Opposing edges of the filter media sheet 48 may be secured together by a sewn seam 70 to secure the filter media 48 onto the support tube 46.

Advantageously, the end cap 50 of the secondary filter cartridge 28 includes an axially outwardly extending and at least partially radially compressible (or deflectable) flexible crown 52 formed one piece with or permanently mounted to the end cap 50. Although the crown 52 is somewhat deflectable, it is primarily substantially rigid so as to be operative to radially support the secondary filter cartridge 28 on the end cap of the main filter cartridge 26. The crown 52 includes a plurality of axially extending legs 54 arranged surrounding a central rib or projecting pin 56, the central projecting pin 56 formed one piece with or permanently mounted onto the end cap 50, The central projecting pin may have a cross-shaped cross section as shown in FIG. 3B, although other cross sections (for example square, circular, etc) are also within the invention.

Preferably the plurality of axially extending legs 54 are arranged on the end cap 50 in a circle encircling the projecting pin 56, although other arrangements such as square, elliptical, etc. encircling the pin are envisioned and fall within the scope of the present inventive disclosure. Preferably the crown 52 is provided with six axially extending legs 54 as shown in FIG. 3B, although the present invention is not limited to the use of exactly six legs 54 shown in FIG. 3B. Any number of legs may be used.

FIG. 4A depicts the filter housing end wall 58 viewed from the exterior of the second housing part 14 or housing cap. The end wall 58, particularly on the interior side, includes a plurality of axially inwardly projecting end wall projections 60 formed in one piece with or secured onto the interior of the house 14 end wall 58. Although shown for clarity, the end wall projections 60 in FIG. 4A are to be understood as arranged on the interior side of the end wall 58.

Figure 4B:
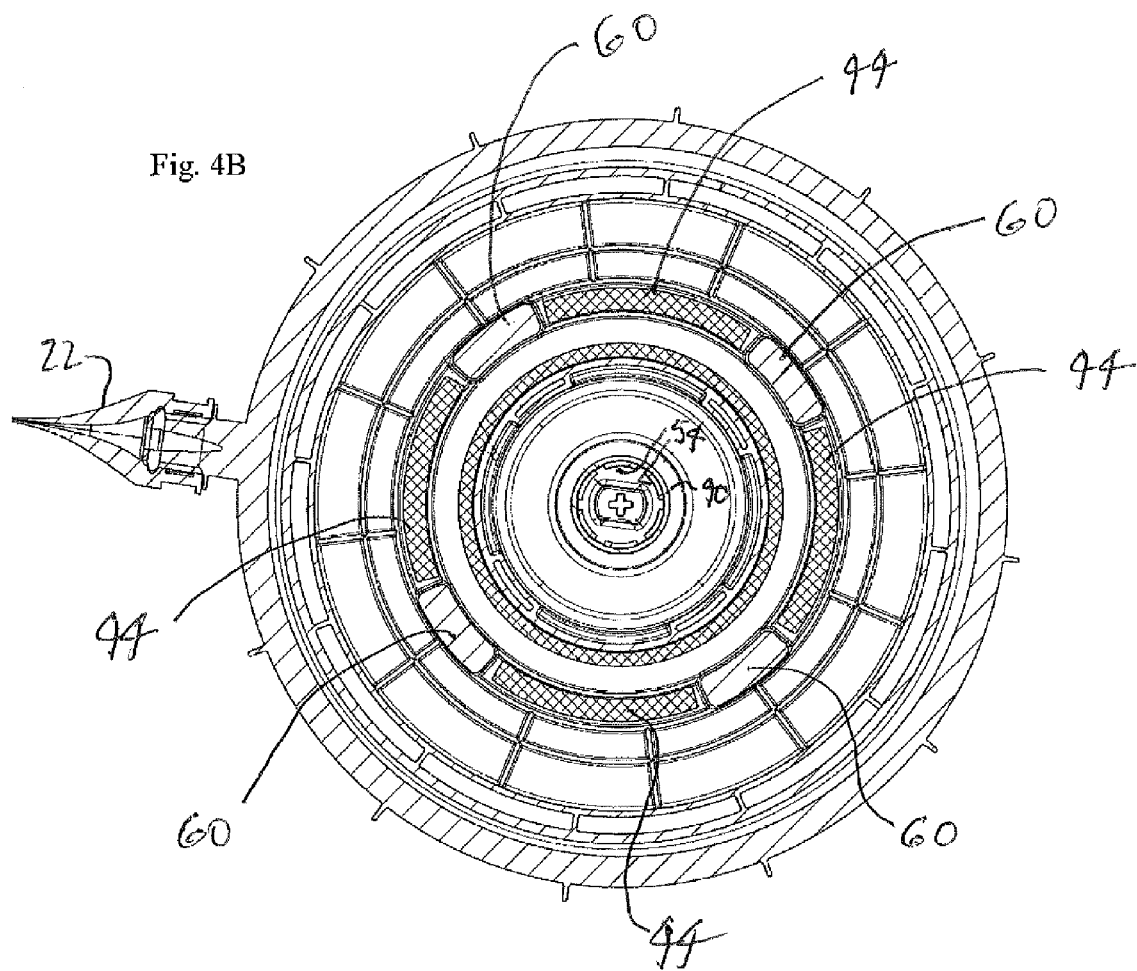
FIG. 4B depicts an interior view of the second housing part of FIG. 4A, taken at the section line 4B-4B of FIG. 1, depicting radially locking engagement of a main filter cartridge and filter housing, consistent with the present invention.

FIG. 4B is a section view of the end wall 58 of the second housing part 14 taken along the cutting line 4B-4B of FIG. 1. Referring again to previously discussed FIG. 1, you will note that the main filter cartridge 26 is installed in the filter housing 14. For illustration and discussion purposes, the cutting line 4B-4B cuts through the axially extending arcuate projections 44 of the main filter cartridge 26 lower end cap 32, as shown on and discussed previously with FIGS. 2A and 2C.

In FIG. 4B the interposing "keyed" engagement of the arcuate projections 44 of the main filter cartridge 26 into the gaps between the axially inwardly projecting end wall projections 60 of the second housing part 14 is clearly shown. As can be seen in FIG. 4B, the "keyed" engagement or interferences between the pre-defined spacing, quantity and individual lengths of the end wall projections 60 of the second housing part 14 and the complimentary pre-defined spacing, quantity and individual lengths of the arcuate projections 44 of the main filter cartridge 26 are operative to "key" or specifically select an appropriate filter cartridge suitable and adapted for the intended service for use within the filter housing 12, 14, while advantageously excluding other filter cartridges having unsuitable specifications or unsuitable filtering, material properties for the service or unsuitable chemical properties. Advantageously, potentially damaging errors can be prevented by mechanically excluding through keyed interferences the accidental installation of incompatible or off-spec main filter cartridges into the filter housing 12, 14. Also shown are the axially extending legs 54 of the crown 52 of the secondary filter cartridge 28, compressed/deflected and received within the axially outwardly extending receptacle cup 40 formed into the end cap 32 of the main filter cartridge 26.

FIG. 5 depicts an enlarged view of the region identified as "5" in FIG. 1, showing the lower end cap 32 of the main filter cartridge 26 with the axially outwardly projecting dome having receptacle cup 40 formed unitary/one-piece with the lower end cap 32 and receiving via interference fit the axially extending legs 54 of the flexible crown 52 of the end cap 50 of the secondary filter cartridge 28. As can be seen in FIG. 5, the crown legs 54 are received against and slightly deflected by abutment against the radial inner surface 76 of the receptacle cup 40. As discussed earlier, the crown, end cap 50 and the lower end cap 32 are substantially rigid, preferably molded plastic components. Radial engagement of the crown legs 54 into the receptacle cup 40 radially locks the position of the secondary filter cartridge 28 to the main filter cartridge 26, providing radial support to the secondary filter cartridge at this axial end of the cartridge. Referring to FIG. 1 it can be seen that the opposing axial end of the secondary filter cartridge is mounted to the first housing part 12 at the outlet connection 20 (preferably by threaded engagement of threads 72 on the secondary filter cartridge 28 and thread 78 on a housing projection concentric with the outlet connection 20) and therefore receives radial and axial support from the housing also at the end opposing the secondary filter cartridge end depicted in FIG. 5. Therefore with the radial engagement of the crown into the receptacle cup the secondary filter cartridge is fully supported at both ends within the main filter cartridge.

As can also be seen in FIG. 5, taken with reference to FIG. 2C, the anti-rotation housing engagement member 42 formed in one piece with the receptacle cup 40 is received into and extends through a similarly/complimentary shaped anti-rotation housing opening 62 arranged in the end wall 58 of the second housing part 14. In one exemplary embodiment the housing engagement member 42 may have an oval cross section (2 straight sides closed with semi-circular ends), or preferably as shown, the housing engagement member 42 is a "convex rectangular" cross section, "convex rectangular" as defined earlier with FIGS. 2B and 2C and more clearly shown in FIGS. 2B and 2C. Referring also to FIG. 4A, visible on the outside of the second housing part is the anti-rotation housing engagement member 42 projecting through the anti-rotation housing opening 62 in the end wall of the second housing part. The anti-rotation housing engagement member 42, in addition to enforcing proper rotational alignment between the filter cartridge and the housing, advantageously also provides a visible indication of a properly installed filter element from the exterior of the filter housing.

As discussed earlier, in other embodiments of the invention the anti-rotation housing engagement member 42 may have other cross-sectional shapes, for example triangular or other polygonal shapes, oblong, ellipse, that "key" the rotational position of the main filter cartridge to the housing end cap by a rotationally locked engagement with the filter housing. Additionally, the cross sectional shape of the anti-rotation housing engagement member 42 and the similarly/complimentary shaped anti-rotation housing opening 62 are effective as an additional means to "key" the main filter cartridge to the filter housing (for example, by different cross sectional shapes or sizes), for the advantages as discussed earlier above with FIG. 4B.

FIG. 6 depicts an enlarged view of the region identified as "6" in FIG. 1. In FIG. 6 one of the arcuate projections 44 of the lower end cap 32 of the main filter cartridge 26 is shown extending axially outwardly into a gap between adjacent end wall projections 60 (see FIG. 4B). As discussed earlier with FIG. 2C, the lower end cap 32 of the main filter cartridge is preferably a two component end cap having a substantially rigid plastic cap layer 32A, preferably a unitary one-piece component of the support tube 26, overlaid by an elastomeric sealing material 32B (example: polyurethane) molded onto or secured onto the substantially rigid plastic cap layer 32A of the support tube 26. The elastomeric sealing material 32B forms the arcuate projections 44 of the lower end cap 32, which are therefore at least somewhat elastically compressible. In FIG. 6 the illustrated arcuate projection 44 of the lower end cap 32 is schematically shown in a "relaxed" or "non-compressed" state projected axially outwardly beyond the end wall 58 of the second housing part 14. In real life however, with the main filter cartridge installed in the filter housing, it is to be understood that the arcuate projection 44 of elastomeric sealing material 32B is instead compressed against the inside surface of the end wall 58 and remains within and not extending through the end wall of the filter housing 14. This compression of the arcuate projections 44 provides an axial force to the main filter cartridge 26 urging the main filter cartridge upwardly against the end face 24 of the first housing part, compressing the elastomeric annular sealing collar 64 to seal radially and/or axially with the first housing part 12 about the outlet connection 20.

As can be understood by viewing FIG. 6 together with FIG. 2C and FIG. 4B, the arcuate projections 44 on the main filter cartridge end cap 32 "key" the filter cartridge to the filter housing and provide support to the main filter cartridge in the filter housing (above axial compression of arcuate projections 44), however the arrangement of the arcuate projections 44 and end wall projections 60 are insufficient to provide a seal between the interior of the filter housing and the outside environment (i.e. through then opening 62). Advantageously, annular seal 66 is formed on the elastomeric sealing material 32B of the lower end cap 32 of the main filter cartridge 26. The annular seal is a continuous annular ring extending axially outwardly from the lower end cap 32 and is configured to engage radially against the annular sealing projection 68 of the end wall 58 of the second housing part 14. The radial sealing (68 engaging 66) is operative to seal the interior of the filter housing from the outside environment, thereby preventing flow through the anti-rotation housing opening 62 of the filter housing 14 and admittance of contaminated air through the anti-rotation housing opening 62.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter cartridge assembly for installation into an air filter housing having an inlet connection for unfiltered air and an outlet connection for filter air, the first filter cartridge assembly comprising:
   a main filter cartridge comprising:
      a substantially rigid support tube having an axially extending sidewall with airflow apertures therethrough, said sidewall defining an axially aligned open interior therein;
      a filter media arranged on, surrounding and secured onto said outside surface of said support tube;
      an annular end cap having an open aperture in air flow communication with said open interior, said end cap secured to a first axial end of said support tube sidewall and/or said filter media;
      a closed end cap secured to an opposing second axial end of said support tube sidewall, said closed end cap including
         a centrally arranged axially outwardly extending dome member arranged in said closed end cap;
         an anti-rotation engagement housing member arranged on an outward facing surface of said dome member and extending axially outwardly therefrom, said anti-rotation engagement member having a radially elongated or polygonal radial cross section configured to be received into and rotationally lock to a complimentary anti-rotation opening in said filter housing;
         a plurality of arcuate axially extending projections on an outward facing surface of said closed end cap encircling said dome member with circumferential gaps between said projections, said projections each having pre-defined keying characteristrics including
            a pre-defined and arc length, wherein different ones of said arcuate axially extending projections can have different arc lengths;
            a pre-defined projection length measured axially relative to said outward facing surface, wherein different ones of said arcuate axially extending projections can have different projection lengths;
            a pre-defined arcuate projection width, wherein different ones of said arcuate projections can have different projection widths;
            a pre-defined gap spacing between adjacent arcuate projections, wherein different pairs of said arcuate projections can have different gap spacings;
            a pre-defined number of said arcuate projections on said closed end cap;

wherein said pre-defined characteristics key particular intended type of said filter cartridges for use in filter housing where said filter cartridge type is intended, wherein said pre-defined characteristics are operable to prevent accidental use of a non-intended type of said filter cartridge;

a continuous annular elastomeric seal arranged radially between said plurality of arcuate axially extending projections and said dome member and projecting axially outwardly from said closed end cap, said annular seal configured to radially seal against the outward facing surface of an annular sealing projection.

2. The filter cartridge according to claim 1, wherein said annular end cap includes an axially outwardly projecting elastomeric annular sealing collar surrounding said open aperture in said end cap, wherein said closed end cap includes a substantially rigid first end cap layer unitary with said support tube sidewall, said rigid end cap layer extending over said open interior at the second axial end of said support tube, said first end cap layer;

wherein said centrally arranged axially outwardly extending dome member is arranged in said first end cap layer, wherein an annular elastomeric second end cap layer of an elastomeric sealing material is bonded to and overlaying said first end cap layer, and wherein said plurality of arcuate axially extending projections are elastomeric projections formed in said second end cap layer.

3. The filter cartridge assembly of claim 2, wherein said closed end cap includes said substantially rigid first end cap layer is unitary with said support tube sidewall, said rigid end cap layer extending over said open interior at the second axial end of said support tube, said first end cap layer including
a closed central region;
a plurality of openings extending through said first end cap layer, said plurality of openings circumferentially surrounding said closed central region;

wherein said outwardly extending dome member is provided in said closed central region of said first end cap layer, and wherein said annular elastomeric second end cap layer extends through and closing over said plurality of openings in first end cap layer mechanically securing said second end cap layer to said first end cap layer.

4. The filter cartridge assembly of claim 1, further comprising a secondary filter cartridge axially aligned with and radially nested within said open interior of said main filter cartridge, said second filter cartridge comprising:

a substantially rigid support tube including
an elongated tubular body member including an airflow permeable sidewall radially surrounding an airflow chamber therein, said sidewall including airflow apertures therethrough;
an end cap extending over said airflow chamber at a first axial end of said secondary element support tube, said secondary filter cartridge end cap including:
an axially outwardly extending, substantially rigid and at least partially radially compressible crown formed one piece with or permanently secured to an axially outwardly facing surface of said secondary element end cap, said crown including:
an axially aligned outwardly extending central projecting pin;
a plurality of axially outwardly extending radially deflectable legs arranged radially encircling said projecting pin, said legs having axial slits separating adjacent ones of said legs;
wherein said central projecting pin extends outwardly beyond said plurality of axially extending legs, said central projecting pin operable to absorb impact and protect said crown legs from damage;
wherein said end cap is a closed end cap fully closing over said airflow chamber at said first axial end of said secondary element support tube;
a mounting means for detachably mounting an opposing second axial end of said secondary element support tube into said air filter housing;

wherein said outwardly extending dome member of said main filter cartridge includes a receptacle cup into which said axially extending legs of said crown are received and abut against a radial inner surface of said receptacle cup, radial engagement of said crown legs into said receptacle cup radially locking the position of said secondary filter cartridge to said main filter cartridge;

a filter media arranged on and closing over sidewall airflow apertures in said secondary filter cartridge support tube.

5. The filter cartridge according to claim 4, wherein said end cap is formed as a unitary one piece component together with said tubular body member of same material as said elongated tubular body member, and wherein said legs of said crown form a tubular extension with said axial slits separating said legs.

6. The filter cartridge according to claim 5, wherein said filter media of said secondary filter cartridge is a non-woven filter media comprises nylon, polyester, glass or polypropylene fibers.

7. The filter cartridge according to claim 5, wherein an elastomeric fixation ring is secured to an axially outwardly facing surface of said secondary element end cap, said elastomeric support ring having an open interior through which said crown axially projects, said elastomeric support ring bonding to an edge portion of said secondary element filter media securing said secondary element filter media to said secondary element support tube.

8. The filter cartridge according to claim 4, wherein said secondary element filter media is secured to said secondary element support tube by welding.

9. The filter cartridge assembly of claim 4, wherein said secondary element filter media is secured to said secondary element support tube by metal or plastic clamp rings compressably mounting said secondary element filter media onto said secondary element support tube.

10. A filter cartridge system comprising:

a filter housing including
an inlet connection for receiving unfiltered air;
an outlet connection for filter air arranged in a first end wall of said filter housing;
a second opposing end wall of said filter housing including
an anti-rotation opening provided in a central portion of said end wall and extending from an interior of said filter housing to an exterior of said filter housing;
a plurality of inwardly extending end wall projections arranged on an inner surface of said end wall encircling said anti-rotation opening;
an annular inwardly extending annular sealing projection;

a substantially cylindrical main filter cartridge arranged within said filter housing between said inlet connection and said outlet connection, wherein said main filter cartridge includes a substantially rigid support tube having an axially extending sidewall with airflow apertures therethrough, said sidewall defining an axially aligned open interior therein;

a filter media arranged on, surrounding and secured onto said outside surface of said support tube;

an annular end cap having an open aperture in air flow communication with said open interior, said end cap secured to a first axial end of said support tube sidewall and/or said filter media;

a closed end cap secured to an opposing second axial end of said support tube sidewall, said closed end cap including a centrally arranged axially outwardly extending dome member arranged in said closed end cap;

an anti-rotation engagement housing member arranged on an outward facing surface of said dome member and extending axially outwardly and received into said anti-rotation opening of said filter housing, said anti-rotation engagement member having a radially elongated or polygonal radial cross-section configured to be received into and rotationally lock to said anti-rotation opening, said rotational lock operative to lock rotational alignment of said first filter cartridge to said filter housing end face;

a plurality of arcuate axially extending projections on an outward facing surface of said closed end cap encircling said dome member with circumferential gaps between said projections, said arcuate axially extending projections received into gaps between said inwardly extending end wall projections of said filter housing, said arcuate projections together with said inwardly extending end wall projections each having pre-defined keying characteristics including a pre-defined and arc length, wherein different ones of said projections can have different arc lengths;

a pre-defined projection length, wherein different ones of said projections can have different projection lengths;

a pre-defined projection width, wherein different ones of said projections can have different projection widths;

a pre-defined gap spacing between adjacent projections, wherein different pairs of said projections can have different gap spacings;

a pre-defined number of said arcuate projections on said closed end cap;

wherein said pre-defined characteristics key particular intended type of said main filter cartridge for use in said filter housing where said filter cartridge type is intended, wherein said pre-defined characteristics are operable to prevent accidental use of a non-intended type of said filter cartridge;

a continuous annular seal arranged radially between said plurality of arcuate axially extending elastomeric projections and said dome member and projected axially outwardly from said outward facing surface of said second end cap layer, said annular seal forming a radial seal sealing against an outward facing surface of said annular sealing projection of said second end wall of said housing.

11. The filter cartridge system according to claim 10, further comprising a secondary filter cartridge axially aligned with and radially nested within said open interior of said main filter cartridge, said second filter cartridge comprising:

a substantially rigid support tube detachably mounted within said filter housing at said outlet connection, said secondary filter cartridge support tube including an elongated tubular body member including an airflow permeable sidewall radially surrounding an airflow chamber therein, said sidewall including airflow apertures therethrough;

an end cap extending over said airflow chamber at a first axial end of said secondary element support tube and formed as a unitary one piece component together with said tubular body member of same material as said elongated tubular body member, said secondary filter cartridge end cap including:

an axially outwardly extending, substantially rigid and at least partially radially compressible crown formed one piece with or permanently secured to an axially outwardly facing surface of said secondary element end cap, said crown including:

an axially aligned outwardly extending central projecting pin;

a plurality of axially outwardly extending legs arranged radially encircling said projecting pin, said legs forming a tubular extension with axial slits separating said legs;

wherein said central projecting pin extends outwardly beyond said plurality of axially extending legs, said central pin operable to absorb impact and protect said crown legs from damage in the event said secondary filter cartridge is dropped;

an elastomeric support ring secured to an axially outwardly facing surface of said secondary element end cap, said elastomeric support ring having an open interior through which said crown axially projects, wherein said end cap is a closed end cap fully closing over said airflow chamber at said first axial end of said secondary element support tube;

wherein said outwardly extending dome member of said main filter cartridge includes a receptacle cup into which said axially extending legs of said crown are received and abut against a radial inner surface of said receptacle cup, radial engagement of said crown legs into said receptacle cup radially locking the position of said secondary filter cartridge to said main filter cartridge;

a filter media arranged on and closing over sidewall airflow apertures in said secondary filter cartridge support tube.

12. A secondary air filter cartridge for nesting within the main filter cartridge of claim 1, comprising:

a substantially rigid support tube including an elongated tubular body member including an airflow permeable sidewall radially surrounding an airflow chamber therein, said sidewall including airflow apertures therethrough;

an end cap extending over said airflow chamber at a first axial end of said secondary element support tube, said secondary filter cartridge end cap including:

an axially outwardly extending, substantially rigid and at least partially radially compressible crown formed one piece with or permanently secured to an axially outwardly facing surface of said secondary element end cap, said crown including:
an axially aligned outwardly extending central projecting pin;
a plurality of axially outwardly extending radially deflectable legs arranged radially encircling said projecting pin, said legs having axial slits separating adjacent ones of said legs;
wherein said central projecting pin extends outwardly beyond said plurality of axially extending legs, said central projecting pin operable to absorb impact and protect said crown legs from damage;
wherein said end cap is a closed end cap fully closing over said airflow chamber at said first axial end of said secondary element support tube;
a mounting means for detachably mounting an opposing second axial end of said secondary element support tube into an air filter housing;
wherein said outwardly extending dome member of said main filter cartridge includes a receptacle cup into which said axially extending legs of said crown are received and abut against a radial inner surface of said receptacle cup, radial engagement of said crown legs into said receptacle cup radially locking the position of said secondary filter cartridge to said main filter cartridge;
a filter media arranged on and closing over sidewall airflow apertures in said secondary filter cartridge support tube.

13. The secondary air filter cartridge according to claim 12, wherein
said end cap is formed as a unitary one piece component together with said tubular body member of same material as said elongated tubular body member, and
wherein said legs of said crown form a tubular extension with said axial slits separating said legs.

14. The secondary air filter cartridge according to claim 12, wherein
said filter media of said secondary filter cartridge is a non-woven filter media comprises nylon, polyester, glass or polypropylene fibers.

15. The secondary air filter cartridge according to claim 12, wherein
an elastomeric fixation ring is secured to an axially outwardly facing surface of said secondary element end cap, said elastomeric support ring having an open interior through which said crown axially projects, said elastomeric support ring bonding to an edge portion of said secondary element filter media securing said secondary element filter media to said secondary element support tube.

16. The secondary air filter cartridge according to claim 12, wherein
said secondary element filter media is secured to said secondary element support tube by welding.

17. The secondary air filter cartridge according to claim 12, wherein
said secondary element filter media is secured to said secondary element support tube by metal or plastic clamp rings compressably mounting said secondary element filter media onto said secondary element support tube.

* * * * *